W. D. GILES.
COUPLING FOR SUCKER RODS.
APPLICATION FILED AUG. 4, 1919.
1,407,327.
Patented Feb. 21, 1922.
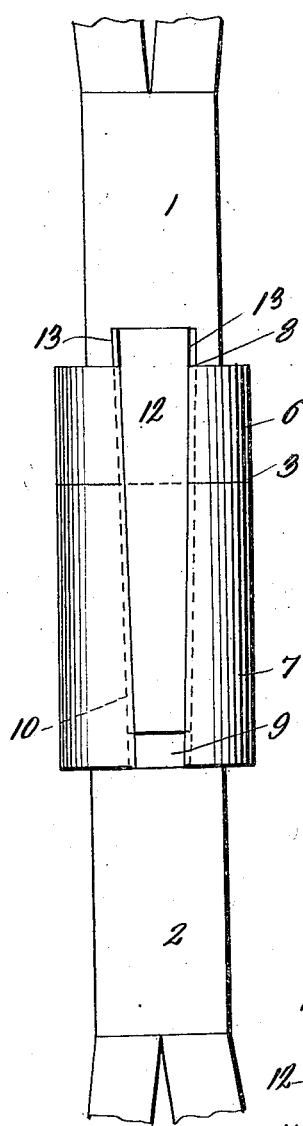
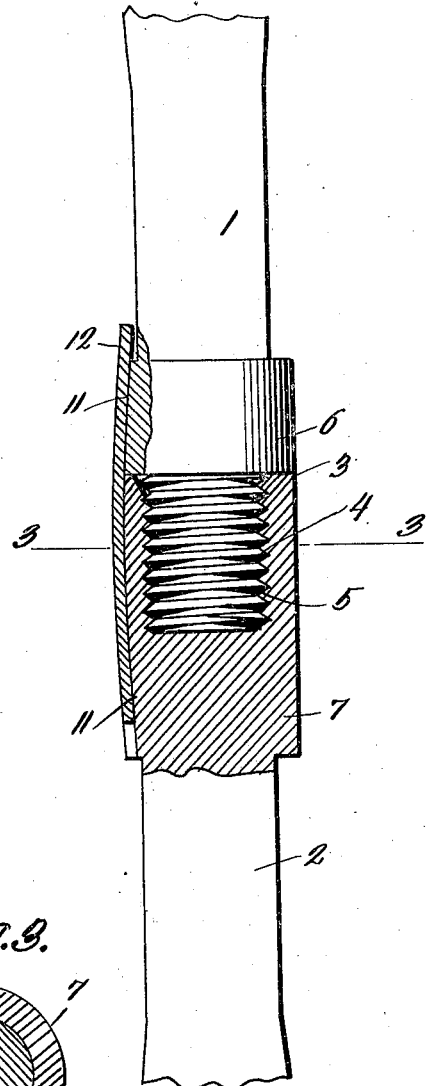
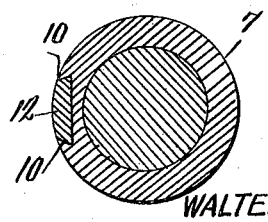
WITNESSES
WALTER DEVOIS GILES Inventor
By Richard Deven
Attorney

UNITED STATES PATENT OFFICE.

WALTER D. GILES, OF LEESVILLE, LOUISIANA.

COUPLING FOR SUCKER RODS.

1,407,327.	Specification of Letters Patent.	Patented Feb. 21, 1922.

Application filed August 4, 1919. Serial No. 315,200.

*To all whom it may concern:*

Be it known that I, WALTER DEVOIS GILES, a citizen of the United States, residing at Leesville, in the parish of Vernon and State of Louisiana, have invented certain new and useful Improvements in Couplings for Sucker Rods, of which the following is a specification.

This invention relates to couplings for sucker rods for wells, more particularly for oil wells.

The object of the invention is to provide a simple and efficient coupling of this character which may be quickly applied and without excessive cost.

Another object is to provide a coupling whereby old material and equipment may be made over on the field at a minimum expenditure of time and money and which avoids the necessity of employing a crew of men to fish out separated rods and the consequent closing down of the well for this purpose.

With the foregoing and other objects in view, which will appear as the description proceeds, the invention resides in the combination and arrangement of parts and in the details of construction hereinafter described and claimed, it being understood that changes in the precise embodiment of the invention herein disclosed may be made within the scope of what is claimed without departing from the spirit of the invention.

In the accompanying drawings:—

Figure 1 is a front elevation of this improved coupling shown applied,

Fig. 2 is a side elevation partly in longitudinal section, and

Fig. 3 is a transverse section taken on the line 3—3 of Fig. 2.

In the embodiment illustrated, two rods or sections 1 and 2 are shown connected, the joint being indicated at 3. Section 1 has a longitudinally extending threaded stud 4 at its meeting end, while section 2 has a threaded socket 5 to receive said stud. These rod ends are equipped with heads or enlargements, section 1 having a head 6 and section 2 a head 7. These heads 6 and 7 are provided in one face with longitudinally extending seats 8 and 9 positioned to register with each other when the sections are connected as is shown clearly in Fig. 1, and which are open at both ends. The side walls of these seats are undercut as shown at 10 and taper longitudinally toward one end. The bottom of these registering seats is curved inwardly at its opposite ends as shown at 11 for a purpose presently to be described.

A locking key 12 tapers from one end to the other as shown clearly in Fig. 1, and has bevelled side edges indicated at 13 which are designed to fit the undercut side walls 10 of the seats to provide a dove-tailed connection between the key and the heads 6 and 7 when the parts are in assembled position. This key 12 is curvilinear when driven into the seats being bent slightly as shown in Fig. 2, whereby a constant pressure is applied, the tension being always at the extreme ends of the key, thereby relieving pressure at the center. When the key is driven out, the tension is removed to the center.

The curving of the bottom of the seat at each end provides for the relieving of vibration or strain on the threads of the ends of the rods when the key is driven home. It is of course known that threads are cut tapering to cause a spread which gives them power to hold. The connection by means of the key and seat above described, relieves part of this spread and reinforces the joint.

From the above description it will be obvious that this improved coupling when applied as set forth, will securely lock the ends of the sections against separation, and the key 12 cannot be accidently disengaged, requiring considerable force to drive it out of its seat. It will also be seen that rod ends provided with this invention may be quickly united, thereby effecting a great saving in time over structures of this character now in use.

It is to be understood of course that the movement of a sucker rod is vertical with a downward tension. This causes tension to be exerted at the joint at different angles, which this improved locking key is designed to overcome. Any suitable ejector may be employed for forcing out the key thereby effecting a great saving in time and labor.

From the foregoing description, taken in connection with the accompanying drawings, the advantages of the construction and of the method of operation will be readily apparent to those skilled in the art to which the invention appertains and while I have described the principle of operation of the invention together with the device which I now consider to be the best embodiment thereof, I desire to have it understood that the device shown is merely illustrative and that such changes may be made as are within the scope of the claimed invention.

Having thus fully described my invention, what I claim as new and desire to secure by Letters Patent, is:—

1. The combination with two members to be connected having longitudinally alined seats with undercut side walls, a key to enter said seats and engage said walls, and means whereby the key is bent on entering said seats to reliably lock it in said seats to securely connect said members.

2. A coupling for sucker-rods comprising two co-members adapted to be connected and having key-seats with undercut walls longitudinally aligned to provide a key way, common to both members, and a key insertible into the key way, said key way being curved longitudinally for holding the key flexed and in locking engagement with the undercut walls of the key way.

3. The combination with two members to be connected having longitudinally alined seats with undercut side walls, said seats being curved inwardly at their ends and a key for insertion in said seats said key being sprung by entering the seats whereby the two members are reliably connected.

4. The combination with two members to be connected having longitudinally alined seats open at both ends and offset laterally beyond the side walls of the members to be connected, said seats having undercut side walls, a key to enter said seats and engage said walls, and means whereby the key is sprung on entering said seats to reliably lock it in the seats and securely connect said members.

In testimony whereof I affix my signature in presence of two witnesses.

WALTER D. GILES.

Witnesses:
Roy F. Seale,
Wm. A. Wintle.